(12) United States Patent
Sakai et al.

(10) Patent No.: US 8,056,364 B2
(45) Date of Patent: Nov. 15, 2011

(54) PREFORM PRODUCTION APPARATUS FOR PRECISION PRESS MOLDING, PRODUCTION METHOD OF A PREFORM FOR PRECISION PRESS MOLDING AND PRODUCTION METHOD OF AN OPTICAL ELEMENT

(75) Inventors: Ryousuke Sakai, Kanagawa (JP);
Tadanao Shinozaki, Kanagawa (JP);
Shinobu Aoe, Kanagawa (JP)

(73) Assignee: Ohara, Inc., Kanagawa (JP)

( * ) Notice: Subject to any disclaimer, the term of this patent is extended or adjusted under 35 U.S.C. 154(b) by 104 days.

(21) Appl. No.: 12/289,328

(22) Filed: Oct. 24, 2008

(65) Prior Publication Data

US 2009/0107180 A1    Apr. 30, 2009

(30) Foreign Application Priority Data

Oct. 26, 2007 (JP) ................ 2007-278783

(51) Int. Cl.
*C03B 9/00* (2006.01)
*C03B 5/26* (2006.01)
(52) U.S. Cl. ............... 65/66; 65/127; 65/112; 65/105
(58) Field of Classification Search ............ 65/359, 65/357, 361, 66, 111, 112, 133, 105, 127, 65/207, 303, 304
See application file for complete search history.

(56) References Cited

U.S. PATENT DOCUMENTS

2004/0237592 A1* 12/2004 Iguchi et al. ............... 65/127
2006/0260361 A1* 11/2006 Yoshida et al. .............. 65/67

FOREIGN PATENT DOCUMENTS

JP    10-338530    * 12/1998
JP    2000-007360   *  1/2000

* cited by examiner

*Primary Examiner* — Richard Crispino
*Assistant Examiner* — Dionne W Mayes
(74) *Attorney, Agent, or Firm* — Hoffman & Baron, LLP

(57) ABSTRACT

A preform production apparatus for precision press molding, which is downsized but can produce preforms at a lower cost, and a production method thereof using the apparatus are provided. The production method of a preform for precision press molding includes forming a molten glass body C by way of receiving and cutting molten glass A, being flowed continuously from a discharge nozzle 2, by a support member 1 or by way of allowing molten glass to fall in drops from a discharge nozzle 2 and receiving thereof by a support member 1, and transferring the molten glass body C from the support member 1 to a mold 5 by way of displacing the support member to near the mold 5, disposed not to be beneath the discharge nozzle 2, while increasing the viscosity of the molten glass body C on the support member 1.

11 Claims, 2 Drawing Sheets

PREFORM PRODUCTION APPARATUS FOR PRECISION PRESS MOLDING, PRODUCTION METHOD OF A PREFORM FOR PRECISION PRESS MOLDING AND PRODUCTION METHOD OF AN OPTICAL ELEMENT

This application is based on and claims the benefit of priority from Japanese Patent Application No. 2007-278783, filed on 26 Oct. 2007, the content of which is incorporated herein by reference.

BACKGROUND OF THE INVENTION

1. Field of the Invention

The present invention relates to a preform production apparatus, for producing preforms from molten glass in a step of producing an optical element, for example, and to a method of producing the same.

2. Related Art

In recent years, reductions in size and weight has progressed in the field of optical apparatuses, and aspherical lenses made of glass have often been used for the purpose of decreasing the number of lenses constructing optical systems of optical apparatuses. Aspherical lenses made of glass are produced mainly by precision press molding, i.e. press-molding a heated and softened glass preform (hereinafter referred to as "preform") by use of a mold with a highly precise molding face, thereby transferring the shape of the molding surface of the mold to the preform.

This method provides advantages such as optical elements being able to be mass-produced in a short period of time while maintaining their highly precise dimensions, since optical lenses are shaped through a preform from molten glass, compared to conventional methods of producing optical lenses from plate glass through multiple steps such as cutting, processing, press, grinding and polishing.

There are a variety of methods to produce preforms for precision press molding; in recent years, float-shaping methods are frequently employed in which molten glass flowing is discharged from a nozzle, the molten glass flowing is received by a mold, and then float-shaped over a porous mold (see Patent Document 1). This method has been tried for various optical glasses since this method can produce preforms having a smooth surface in a short time and a high yield without cold-working such as cutting and polishing.

However, in recent years, the float-shaping has tended to be difficult to apply to high refractive index glasses, which are required as a material of aspherical lenses, etc. That is, optical glass having a special optical constant often exhibits an excessively low viscosity at the temperature where the glass can flow out without generating devitrification (so called, low-viscosity glass material), which makes it difficult to adjust shape using float-shaping with gas.

In order to solve the problems, a publicly known method holds molten glass flowing once on a support member, before transferring to a mold, to cool until a viscosity suitable for shaping is achieved, and then transfers thereof to a mold (see Patent Document 2).

However, in recent years, the viscosity of molten glass has been further decreasing and discharge velocity from nozzles has been of increasing significance, which requires very complicated motions, out of the assumption in conventional apparatuses, such as a plurality of support members preliminarily stands by per discharge nozzle, receives glass flow in series, and immediately moves at a high velocity or with changing the velocity to make the receiving site available to another support member. In a trend to require these complicated motions, a system has been demanded in which a degree of freedom in motion of support members considerably increases, the occupying area of support members decreases, and a number of support members can coexist in an apparatus.

Patent Document 1: Japanese Unexamined Patent Application, First Publication No. 2002-97023

Patent Document 2: Japanese Unexamined Patent Application, First Publication No. 2006-265085

SUMMARY OF THE INVENTION

The present invention has been made to solve the above-mentioned problems; it is an object of the invention to provide a preform producing apparatus for precision press molding, which is downsized but can produce preforms at a lower cost, and a production method thereof using the apparatus. Particularly, it is an object of the present invention to provide an apparatus in which molten glass, flowed out at a very low viscosity, is received in series using a plurality of support members to transfer each thereof to molds and to produce preforms for precision press molding, and a production method thereof.

The present inventors have found that the preform production apparatus for precision press molding can be downsized by way of providing a means for transferring a molten glass body to a mold, thereby achieving the present invention. More specifically, the present invention provides the following.

In a first aspect of the present invention, a production method of a preform for precision press molding includes forming a molten glass body by way of receiving and cutting molten glass being flowed continuously from a discharge nozzle, by a support member, or by way of allowing molten glass to fall in drops from a discharge nozzle and receiving them by a support member, and transferring the molten glass body from the support member to a mold by way of displacing the support member to near the mold disposed to be not beneath the discharge nozzle, while increasing the viscosity of the molten glass body on the support member.

According to a second aspect, in the production method according to the first aspect, transferring the molten glass body is performed by a glass body transfer auxiliary member that is disposed at a position disjunctive from the support member.

According to a third aspect, in the production method according to the first or second aspect, transferring the molten glass body is performed by driving of a displacing means for displacing the support member in three-dimensional directions.

According to a fourth aspect, in the production method according to any one of the first to third aspects, a plurality of the support members is set, the molten glass is received by each of the support members in series, and the molten glass body is transferred to the mold by way of displacing each of the support members, in which the number of the glass body transfer auxiliary members is less than the number of the support members.

According to a fifth aspect, in the production method according to the fourth aspect, the number of the glass body transfer auxiliary members is one.

According to a sixth aspect, in the production method according to any one of the first to fifth aspects, the support member is configured to be openable and closable from a plurality of members, and transferring of the molten glass body is performed by opening and closing the support member by way of contacting the glass body transfer auxiliary member with the support member.

According to a seventh aspect, in the production method according to any one of the first to sixth aspects, the support member is configured from one plate-like, rod-like or multi-angular column-like member having a planar and/or curved surface, and transfer of the molten glass body is performed through inclination, deformation and/or rotation by way of contacting the glass body transfer auxiliary member with the support member.

According to an eighth aspect, in the production method according to any one of the first to seventh aspects, log η is no less than 1.0 at the time when the molten glass body is transferred from the support member to the mold (η: viscosity of molten glass expressed by dPa·s, log: logarithm).

According to a ninth aspect, in the production method according to any one of the first to eighth aspects, log η is less than 1.0 at the time when the molten glass is discharged from the discharge nozzle (η: viscosity of molten glass expressed by dPa·s, log: logarithm).

According to a tenth aspect, in the production method according to any one of the first to ninth aspects, the molten glass body is floated by way of ejecting gas from at least a surface receiving the molten glass of the support member.

According to an eleventh aspect, in the production method according to any one of the first to tenth aspects, the molten glass body is floated by way of ejecting gas from at least a surface receiving the molten glass of the mold.

In a twelfth aspect of the present invention, a production method of an optical element performs precision press molding to a preform produced by the production method according to any one of the first to eleventh aspects.

In a thirteenth aspect of the present invention, a preform production apparatus for precision press molding, includes a discharge nozzle for discharging molten glass flow, a support member for receiving molten glass discharged continuously or discontinuously from the discharge nozzle, a mold for shaping a molten glass body, and a displacing means for displacing the support member supporting the molten glass to be near the mold, in which the displacing means displaces the support member to be near the mold disposed to be not beneath the discharge nozzle, while increasing a viscosity of the molten glass body on the support member.

According to a fourteenth aspect, in the preform production apparatus for precision press molding according to the thirteenth aspect, the displacing means has a glass body transfer auxiliary member disposed at a position disjunctive from the support member, and the molten glass body is transferred from the support member to the mold by the glass body transfer auxiliary member.

According to a fifteenth aspect, in the preform production apparatus for precision press molding according to the thirteenth or fourteenth aspect, the displacing means can displace the support member in three-dimensional directions, and the molten glass body is transferred by way of driving the displacing means.

According to a sixteenth aspect, in the preform production apparatus for precision press molding according to any one of the thirteenth to fifteenth aspects, a plurality of the support members is provided, the molten glass flow is received by each of the support members in series, and the displacing means transfers the molten glass body to the mold by way of displacing each of the support members, in which the number of the glass body transfer auxiliary members is less than the number of the support members.

According to a seventeenth aspect, in the preform production apparatus for precision press molding according to the sixteenth aspect, the number of the glass body auxiliary members is one.

According to an eighteenth aspect, in the preform production apparatus for precision press molding according to any one of the thirteenth to seventeenth aspects, the support member is configured to be openable and closable by way of a plurality of members, and the molten glass body is transferred from the support member to the mold through opening and closing the support member by way of contacting the glass body transfer auxiliary member with the support member.

According to a nineteenth aspect, in the preform production apparatus for precision press molding according to any one of the thirteenth to eighteenth aspects, the support member is configured from one plate-like, rod-like or multiangular column-like member having a planar and/or curved surface, the molten glass body is transferred from the support member to the mold through inclination, deformation and/or rotation by way of contacting the glass body transfer auxiliary member with the support member.

According to a twentieth aspect, in the preform production apparatus for precision press molding according to any one of the thirteenth to nineteenth aspects, log η is no less than 1.0 at the time when the molten glass body is displaced from the support member to the mold (η: viscosity of molten glass expressed by dPa·s, log: logarithm).

According to a twenty-first aspect, in the preform production apparatus for precision press molding according to any one of the thirteenth to twentieth aspects, log η is less than 1.0 at the time when the molten glass is discharged from the discharge nozzle (η: viscosity of molten glass expressed by dPa·s, log: logarithm).

According to a twenty-second aspect, in the preform production apparatus for precision press molding according to any one of the thirteenth to twenty-first aspects, the support member floats the molten glass body by way of ejecting gas from at least a surface receiving the molten glass.

According to a twenty-third aspect, in the preform production apparatus for precision press molding according to any one of the thirteenth to twenty-second aspects, the mold floats the molten glass body by way of ejecting gas from at least a surface receiving the molten glass.

In a twenty-fourth aspect of the present invention, an optical element-production apparatus performs precision press molding to a preform produced by the production apparatus according to any one of the thirteenth to twenty-third aspect.

In a twenty-fifth aspect of the present invention, a production method of an optical element includes forming a molten glass body by way of receiving and cutting molten glass, being flowed continuously from a discharge nozzle, by a support member or by way of allowing molten glass to fall in drops from a discharge nozzle and receiving thereof by a support member, transferring the molten glass body from the support member to a mold for precision press molding by way of displacing the support member to near the mold disposed to be not beneath the discharge nozzle, while increasing the viscosity of the molten glass body on the support member, and performing precision press molding.

In a twenty-sixth aspect, an optical element-production apparatus includes an apparatus for precision press molding that has a discharge nozzle for discharging molten glass flow, a support member for receiving molten glass discharged continuously or discontinuously from a discharge nozzle, a mold for molding a molten glass body, and a displacing means for displacing the support member supporting the molten glass to be near the mold, in which the displacing means forms a molten glass body from the molten glass flow and displaces the support member to be near the mold, disposed to be not beneath the discharge nozzle, while increasing viscosity of the molten glass body on the support member.

In accordance with the present invention, the design of the preform production apparatus for precision press molding achieves a higher degree of freedom and also the apparatus can be downsized by virtue of employing the configuration to displace the support member by the transfer means.

DETAILED DESCRIPTION OF THE INVENTION

In the method of producing a preform for precision press molding of the present invention, a molten glass body is formed by way of receiving and cutting molten glass, being flowed continuously from a discharge nozzle, by a support member or by way of allowing molten glass to fall in drops from a discharge nozzle and receiving thereof by a support member, and the molten glass body is transferred from the support member to a mold by way of displacing the support member to be near the mold, disposed to be not beneath the discharge nozzle, while increasing the viscosity of the molten glass body on the support member.

In addition, the preform production apparatus for precision press molding of the invention includes a discharge nozzle for discharging molten glass flow, a support member for receiving molten glass discharged continuously or discontinuously from the discharge nozzle, a mold for molding a molten glass body, and a displacing means for displacing the support member supporting the molten glass to be near the mold, in which the displacing means displaces the support member to be near the mold, disposed not beneath the discharge nozzle, while increasing viscosity of the molten glass body on the support member.

The preform production apparatus for precision press molding of the invention and the production method thereof are explained specifically with respect to embodiments thereof in the following; however, the invention is not be limited to the embodiments below and can be carried out with appropriate modifications within the scope of the object of the invention. In addition, although there are cases in which passages with redundant descriptions may be omitted; however, this does not limit the object of the invention.

Preform Production Apparatus for Precision Press Molding

Figure 1:
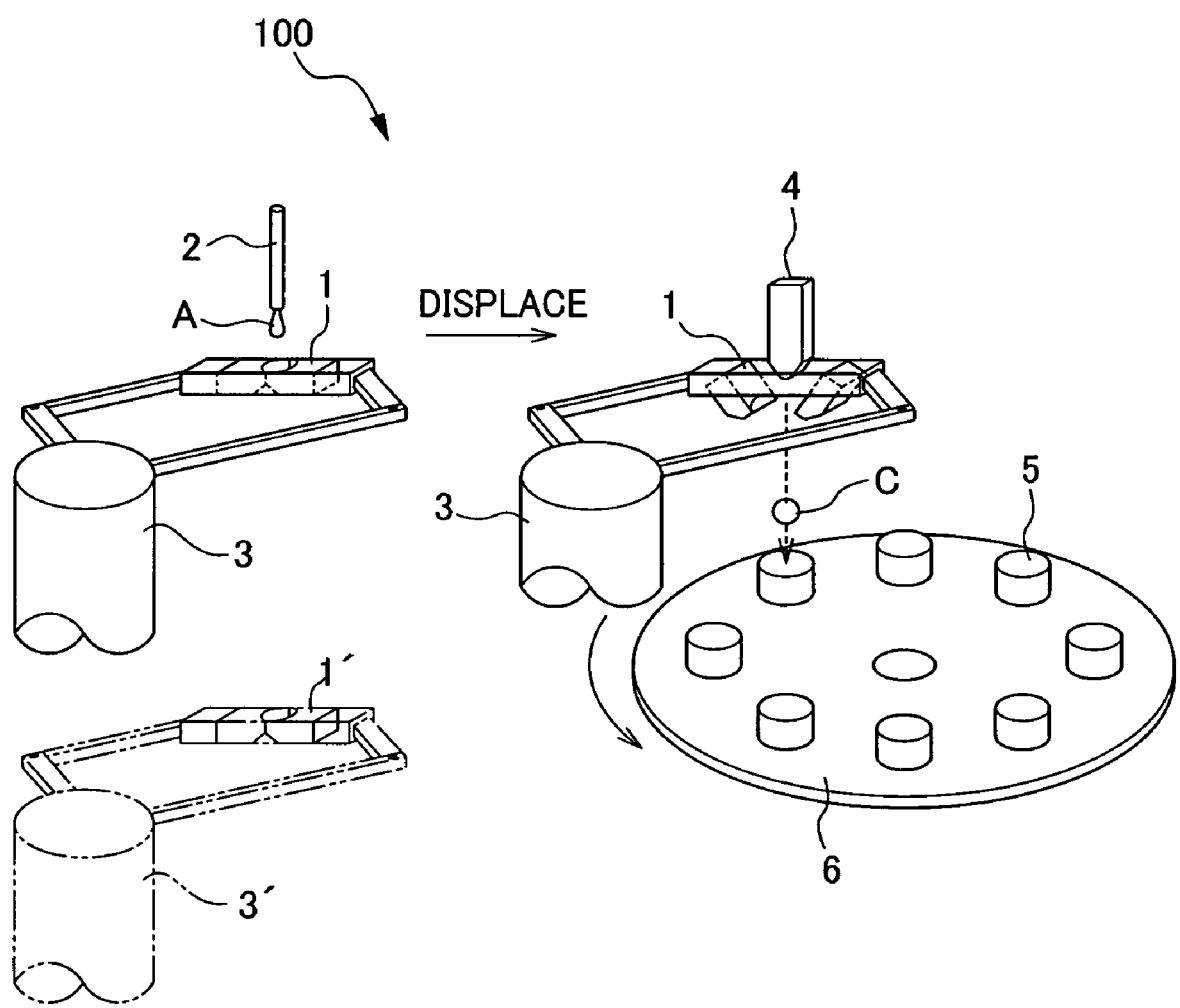
FIG. 1 schematically shows an embodiment of the preform production apparatus for precision press molding of the invention.

FIG. 1 schematically shows a preform production apparatus 100 for precision press molding of the invention. The preform production apparatus 100 for precision press molding of the invention includes a discharge nozzle 2 for discharging molten glass A from a melting furnace (not shown), a support member 1 for receiving a part of molten glass A (molten glass body C) discharged continuously from the discharge nozzle 2, a displacing means 3 for displacing, while also retaining, the support member 1, and a glass body transfer auxiliary member 4 that transfers molten glass onto a mold by way of pushing open the support member 1, displaced by the displacing means 3, or tilting, deforming and/or rotating the support member 1. A plurality of molds 5 is also provided that receives the molten glass body C, transferred from the support member 1, by the glass body transfer auxiliary member 4. The position of the mold 5 is arranged to be not beneath the discharge nozzle 2.

The discharge nozzle 2 is communicated with a melting furnace (not shown) and discharges the molten glass that has been molten by the melting furnace. It is preferred for the discharge nozzle 2 to be able to control the temperature and viscosity of glass flow by use of electric direct heating, indirect heating by external heaters, etc. or a combination thereof. It is preferred in this case that the temperature is controlled such that log η is less than 1.0 at the time when the molten glass is flowed out from the discharge nozzle 2 (η: viscosity of molten glass expressed by dPa·s, log: logarithm). The viscosity of the discharged glass is not limited as long as it is capable of cutting and shaping the molten glass flow. However, the method of the invention described later is very effective compared to the prior art when glass bodies are float-shaped from a low-viscosity glass material that exhibits log η of less than 1.0.

A sensor (not shown) may be provided at the discharge nozzle 2 or in the vicinity thereof to detect time, volume or mass, etc.; and molten glass of a predetermined volume or mass is discharged per predetermined time by virtue of the sensor.

The support member 1 is provided so as to receive the glass flow discharged from the discharge nozzle 2 and to displace a resulting molten glass body C to be near a mold while increasing the viscosity thereof.

In this regard, the flow of molten glass to be received may be continuous or discontinuous. For example, glass having a higher viscosity at melting may be received by the support member 1 after taking a droplet-like discontinuous flow at a nozzle tip by action of its own surface tension (drop shaping). On the other hand, glass having a lower viscosity at melting tends to take a continuous flow due to unlikely separation by surface tension. It is, therefore, preferred that a method to form a glass body is employed where molten glass flow is received by a support member, and then the support member is rapidly lowered to forcibly cut the glass flow (push-up shaping).

In addition, in a case where the viscosity of molten glass is lower, it is also necessary to efficiently advance the step of push-up shaping the glass flow since the glass flows out very rapidly. It is, therefore, preferred that the preform production apparatus 100 for precision press molding of the invention has a plurality of support members 1, where each of the support members 1 can receive the glass flow in series. Consequently, the support members 1 can continuously receive the molten glass A at an approximately constant rate from the molten glass A flowing out continuously, and thus preforms for precision press molding can be effectively produced.

That is, it is preferred to maintain a state where any one of the support members consistently receives the glass flow such that when a support member 1 is receiving the glass flow, another support member 1' is standing by in the vicinity, then the next support member 1' starts to receive the glass flow at the same time as the support member 1 cuts the glass flow and starts to transfer it to a mold.

It is preferred that the support member 1 receives the glass flow substantially beneath the discharge nozzle 2. A light-emitting portion (not shown) to emit light such as visible light or infrared light and a sensor portion (not shown) to detect light from the light-emitting portion may be provided between the discharge nozzle 2 and the support member 1 transferred to approximately beneath the discharge nozzle 2, thereby allowing detection of molten glass having been discharged from the discharge nozzle 2.

The support member 1 is not specifically limited in regards to the shape in particular as long as it is capable of receiving the molten glass flow and supporting the molten glass body C; for example, an openable and closable configuration formed of a plurality of members as shown in FIG. 1 or Japanese Unexamined Patent Application, First Publication No. Hei 06-340430 or a configuration of one plate-like, rod-like or multiangular column-like member having a planar and/or curved surface, as described in Japanese Unexamined Patent Application, First Publication No. 2004-300020, is preferable.

The support member 1 is not specifically limited in regards to the material as long as it is capable of achieving the purpose described above. When it is of a non-porous material, it is preferred to be configured from a material that exhibits poor wettability with molten glass; for example, various conventional materials may be utilized such as carbon materials including graphite, complex materials of nitrides and carbides, and refractory metals having a nitrided surface. Furthermore, porous materials may be used in place of non-porous materials.

On the other hand, gas may be ejected from a receiving surface of the support member 1, preferably, from at least the surface to receive the molten glass A. In this case, it is preferred that the surface of the support member 1 to receive the molten glass A (receiving surface) is formed from a refractory porous material or a porous metal of sintered stainless steel, and thus numerous fine pores are located over the entire surface of the support member 1. In addition, unnecessary fine pores in areas except for the receiving surface may be blocked up by applying a coating so that gas leakage is prevented from the fine pores.

The support member 1 may be provided with a coating of metal, etc. having poor wettability with the molten glass as required in order to prevent fusion of the molten glass A.

A gas supply chamber (not shown) may be provided inside the support member 1. When gas, such as air and inert gases, is supplied from the gas supply chamber, the gas blows out from the receiving surface through the numerous fine pores. Consequently, the molten glass C is cooled and the viscosity increases. Furthermore, the molten glass body C can be floated by blowing the gas to the outside.

Moreover, a water-cooled pipe (not shown) may be provided to cool the support member 1 inside the support member 1, as required. The water-cooled pipe communicates with a cooling water source through a cooling water-feed pipe and a cooling water-discharge pipe to circulate cooling water.

The molten glass C, received on the support member 1, is cooled to increase the viscosity while being transferred to the mold 5. In this regard, the shape tends to be difficult to be controlled by float-shaping when the viscosity is too low during transferring to the mold 5. It is, therefore, preferred that logε is no less than 1.0 at the time when the molten glass C is transferred from the support member 1 to the mold 5, more preferably no less than 1.1, and most preferably no less than 1.2 (η: viscosity of the molten glass C expressed by dPa·s, log: logarithm).

The displacing means 3 holds and displaces a plurality of support members 1. It is preferred that the displacing means 3 uses a plurality of robotic arms having a configuration to be displaceable in three-dimensional directions. In addition, the method of holding the support member 1 is not specifically limited and does not necessarily have a mechanism to open and close the support member 1.

In this regard, all displacement of the support member 1 depends on movement of the displacing means 3. That is, displacement accompanied with cutting the glass flow at push-up shaping and motion to displace the molten glass body C from near the discharge nozzle 2 to near the mold 5 are completely by way of driving the displacing means 3. In this case, when the displacing means 3, e.g., a robotic arm, is pre-programmed, the support member 1 can be freely displaced, and thus the flow-out mold 5 and the glass body transfer auxiliary member 4 can be set at optional sites, thereby enabling the preform production apparatus for precision press molding 100 to be downsized. Furthermore, it is preferred that the support member 1 is displaced linearly (i.e. reciprocating motion) and/or annularly (preferably, circular) in order to effectively receive a part of the molten glass A (molten glass C) by a plurality of supporting members 1 and to repeat the operation to receive a part of the molten glass A after transferring onto the mold 5.

The process to hold the support member 1 is not particularly limited as long as it is capable of holding and transferring from beneath the discharge nozzle 2 to near the glass body transfer auxiliary member 4 without detaching the support member 1. As terms of the holding method, for example, methods described in publicly known documents such as Japanese Unexamined Patent Applications, First Publication Nos. Hei 01-140738, Hei 02-83182, and Hei 02-82550 can be used.

Furthermore, by way of displacing the support member 1 at a constant speed or while appropriately changing the velocity in accordance with a preset program, the molten glass A can be cut at an approximately constant amount and also the molten glass body C can be obtained at an approximately constant amount. In addition, since the molten glass body C tends to deform under external force while having lower viscosities, the displacing velocity can be properly altered in order to maintain the intended shape of the molten glass body C.

The glass body transfer auxiliary member 4 transfers the molten glass body C from the support member 1 to the mold 5. In conventional glass body-shaping apparatuses, an opening-closing mechanism is connected to a support member, molten glass is received by a support member disposed beneath a discharge nozzle, and glass bodies are dropped on molds disposed on a rotating table depending on a glass discharge velocity. In addition, rotational motion of the rotating table is performed in conjunction with the glass discharge velocity, and mechanical operations from flow-out to shaping are carried out cooperatively. However, in order to shape glass materials with a lower viscosity in particular, it is necessary to receive glass flow using a plurality of support members 1 in series and to carry glass bodies at a higher velocity or variable velocities.

Therefore, in this embodiment, the molten glass body C is transferred by use of the glass body transfer auxiliary member 4 provided at a separate position disjunctive from the support member 1, thereby considerably enhancing the degree of freedom of the support member 1 with respect to downsizing and displacement.

The glass body transfer auxiliary member 4 is disposed at a position that is disjunctive from the support member 1 and near the mold 5 to shape the molten glass body C, and also the dropped molten body C can be received at the position by the mold 5 when the molten glass body C on the support member 1 is transferred onto the mold 5. The glass body transfer auxiliary member 4 operates the support member 1 to transfer the molten glass body C when the glass body C is moved from the support member 1 to mold 2. For example, an openable and closable support member is opened temporarily by way of contacting the glass body transfer auxiliary member 4 from an upper side to the openable and closable support member 1 under a closed state as shown in FIG. 1. When an openable and closable support member 1 is employed, it is required to maintain a closed state in a normal state, which may be achieved by action of an elastic body, magnetic force, or shape-memory alloys, etc.

In addition, when the support member 1 is plate-like, rod-like or multiangular column-like having a planar and/or curved surface, as described above, the support member 1 is inclined, deformed and/or rotated by an action of the glass body transfer auxiliary member 4, e.g., contact therewith. Consequently, the molten glass body C on the support member 1 drops, and the mold 5 receives the dropped molten glass body C, thereby enabling the molten glass body C to be transferred onto the mold 5.

The glass body transfer auxiliary member 4 is not limited in regards to the number thereof as long as it is capable of achieving the purpose described above. It is preferred that the number is less than that of the support members 1 in order to downsize (make compact) the apparatus 100, preferably, the number is one.

The glass body transfer auxiliary member 4 does not necessarily contact the support members 1. For example, in a case where an opening-closing mechanism is provided using the attraction force of magnets, a tip portion of the glass body transfer auxiliary member 4 is arranged to have a polarity different from that of the site of the support member 1 facing the glass body transfer auxiliary member 4, thereby enabling the support member 1 to be made into an opened state by use of the repulsion force of magnets, even in a non-contacting state.

The mold 5 is provided in order to shape the transferred molten glass bodies C; preferably, a plurality of molds 5 is provided. The site to dispose the mold 5 is not specifically limited as long as it is not beneath the discharge nozzle 2.

For example, in the case of disposing on a rotating table 6, the plurality of molds 5 is displaced to be near the glass body transfer auxiliary member 4 by way of turning the rotating table 6, and then receiving the molten glass bodies C dropped from the support member 1. Furthermore, the molds 5 may be selected from various publicly known molds.

Moreover, although FIG. 1 shows the molds 5 disposed uniformly on the rotating table 6, the present invention is not limited thereto. In the present invention, since the displacing means 3 can freely transfer the molten glass bodies 3, distribution itself of the molds 5 is not an important issue. Therefore, the molds 5 may be disposed linearly or irregularly. It is also unnecessary for the molds 5 to be displaced in conjunction with other mechanisms such as for cutting molten glass, as with rotating tables in conventional apparatuses.

It is preferred that the molten glass body C is float-shaped on the mold 5. The aspects of the float-shaping are exemplified by those described in publicly known documents such as Japanese Unexamined Patent Application, First Publication Nos. Hei 06-122526, Hei 08-319124, Hei 08-325021, and 2002-310439. The molten glass body C may be tailored in regards to the shape thereof, for example, by way of pressing processes using upper molds, besides the abovementioned float-shaping, as described in Japanese Unexamined Patent Applications, First Publication Nos. Hei 06-40730, Hei 09-52720, and 2000-302473.

It is also preferred for a porous material to be used for the mold 5 and gas to be ejected from at least the receiving surface in order to perform float-shaping of the molten glass body C. The receiving surface of the mold 5 may have an inverted cone shape made of a non-porous material, for example, as described in Japanese Unexamined Patent Application, First Publication No. 2003-40632.

The preform producing apparatus 100 of the present invention can set a displacing direction for each of the support members 1. Operating efficiency can be considerably increased in such a way that a plurality of glass body transfer auxiliary members 4 is set, and the support members 1 are displaced independently to be near each of the glass body transfer auxiliary members 4.

On the other hand, a mold for precision press molding may be used as the mold 5 and the glass body cooled by the support member may be transferred directly to the mold for precision press molding to perform the precision press molding.

Method of Producing Preform for Precision Press Molding

The method of producing a preform for precision press molding of the present invention is performed using the preform production apparatus 100 described above. Furthermore, explanations are omitted for redundant passages with the abovementioned contents.

FIG. 2A to 2G show a flow diagram of the method of producing a preform for precision press molding of the present invention. Furthermore, although FIG. 2A to 2G show a case in which the support member 1 has an opening-closing mechanism, for convenience of explanation, the present invention is not limited thereto.

Figure 2A:
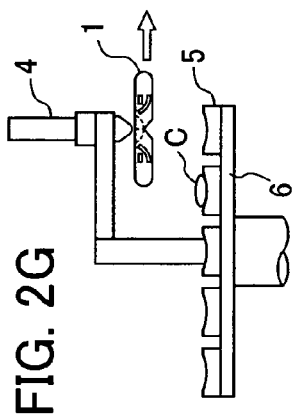
FIG. 2A to 2G schematically show an embodiment of the production method of a preform for precision press molding of the invention.
Figure 2B:
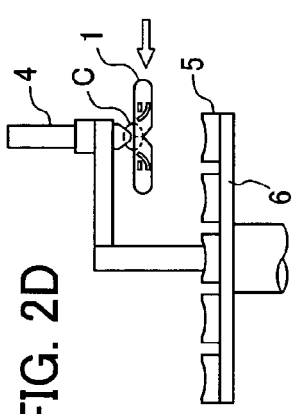

The support member 1, held by a displacing means 3 (not shown in FIG. 2A to 2G), is displaced to be below the discharge nozzle 2 (FIG. 2A), and receives the continuously flowing molten glass A (FIG. 2B). In a case where the preform production apparatus 100 for precision press molding is provided with a plurality of support members 1, for example, as shown in FIG. 1, another support member 1' is standing by below the support member 1 that is receiving the continuously flowing molten glass A, and then the support member 1 that is receiving the continuously flowing molten glass A is displaced as well as another support member 1' is raised to be near the discharge nozzle 2 to access thereto, the support member 1' thereby receiving the molten glass A. Preforms for precision press molding can be effectively and promptly produced by way of repeating this operation in series. Furthermore, the position where each of the support members waits, etc. is not specifically limited as long as the plurality of support members is capable of continuously receiving the continuously flowing molten glass A.

Figure 2C:
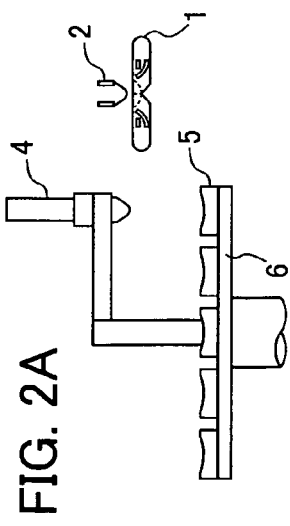
Figure 2D:
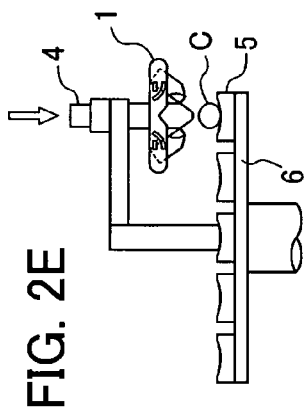

The molten glass A, discharged from the discharge nozzle 2, is received by the receiving surface of the support member 1 held by the displacing means 3, and after a certain period, the support member 1 is displaced to be near the glass body transfer auxiliary member 4 by the displacing means 3 as along with the molten glass A being cut and separated from the flow-outlet of the discharge nozzle 2 to form the molten glass body C of a fixed amount (FIG. 2C). During displacement of the molten glass body C by the displacing means 3, the molten glass body C is cooled as required by way of ejecting gas, supplied from gas supply chamber (not shown) provided at the support member 1, thereby increasing the viscosity.

Figure 2E:
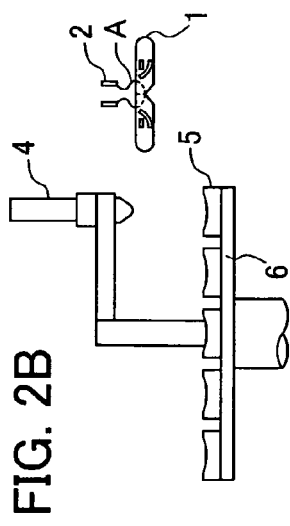

The support member 1 is transferred to be near the glass body transfer auxiliary member 4 while cooling the molten glass body C (FIG. 2D), the molten glass body C on the support member 1 is dropped onto the mold 5 by way of contacting the glass body transfer auxiliary member 4 with the support member 1, and the mold 5 then receives the dropped molten glass body C (FIG. 2E).

Figure 2F:
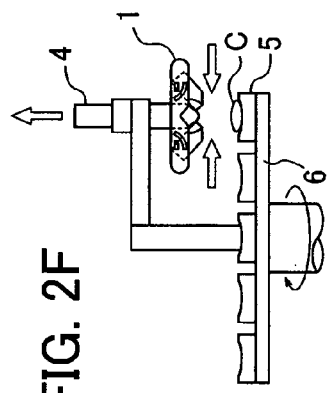

In a case where the support member 1 has an opening-closing mechanism, the support member 1 enters a closed state upon the molten glass body C being transferred to the mold (FIG. 2F).

In a case where the support member 1 has no opening-closing mechanism, the transfer is achieved by such a way that the glass body transfer auxiliary member 4 makes contact with the support member 1, for example, to incline, deform and/or rotate, etc. the support member 1, thereby dropping the molten glass body C and the mold 5 receiving the molten glass body C. In this case, only the support member 1 may be inclined and/or rotated, or the displacing means 3 may be inclined and/or rotated together therewith.

The support member 1, which has transferred the molten glass body C, is displaced to be beneath the discharge nozzle 3 again by the displacing means 3, to receive the molten glass A continuously being discharged from the discharge nozzle 2 (FIG. 2G), this step being repeated in series.

Figure 2G:
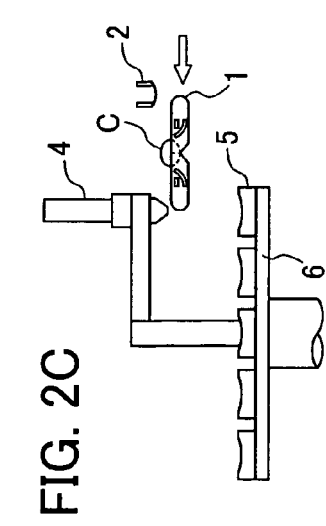

Furthermore, the molten glass body C, received by the mold 5, is float-shaped on the mold 5 (FIG. 2G). The preform, produced by the processes described above, is then subjected to precision press molding by a precision press molding apparatus, thereby preparing an intended optical element.

In addition, it may be subjected directly to precision press molding by use of a mold for precision press molding as the mold.

Although the apparatuses of the present invention may be used mainly to produce preforms for precision press molding, optical elements may be produced consistently from molten glass flow by way of connecting the apparatuses of the present invention with publicly known precision press molding apparatuses. Specific aspects of precision press molding apparatuses, connecting mechanisms, and conveying mechanisms are not limited to those discussed above.

We claim:

1. A method of producing a preform for precision press molding, wherein a plurality of support members which receive and support molten glass is provided, the method comprising the steps of:
    forming a molten glass body by either receiving and cutting the molten glass, being flowed continuously from a discharge nozzle, by a support member, or by allowing the molten glass to fall from the discharge nozzle and receiving the molten glass by a support member;
    displacing the support member which has received the molten glass body to near a mold disposed at a location that is not beneath the discharge nozzle, while increasing the viscosity of the molten glass body on the support member, while at the same time displacing another support member to beneath the discharge nozzle to form another molten glass body; and
    respectively transferring the molten glass bodies received by the support members from the support members to the mold by way of at least one glass body transfer auxiliary member provided at a position separate from the support members, wherein the number of glass body transfer auxiliary members is smaller than the number of support members.

2. The method of producing a preform according to claim 1, wherein transferring the molten glass body is performed by driving of a displacing means for displacing the support member in three-dimensional directions.

3. The method of producing a preform according to claim 1, wherein the number of the glass body transfer auxiliary members is one.

4. The method of producing a preform according to claim 1, wherein the support member is configured to be openable and closable from a plurality of members, and transferring of the molten glass body is performed by opening and closing the support member by way of contacting the glass body transfer auxiliary member with the support member.

5. The method of producing a preform according to claim 1, wherein the support member is configured from one plate-like, rod-like or multiangular column-like member having a planar and/or curved surface, and transfer of the molten glass body is performed through inclination, deformation and/or rotation by way of contacting the glass body transfer auxiliary member with the support member.

6. The method of producing a preform according to claim 1, wherein $\log \eta$ is no less than 1.0 at the time when the molten glass body is transferred from the support member to the mold ($\eta$: viscosity of molten glass expressed by dPa·s, log: logarithm).

7. The method of producing a preform according to claim 1, wherein $\log \eta$ is less than 1.0 at the time when the molten glass is discharged from the discharge nozzle ($\eta$: viscosity of molten glass expressed by dPa·s, log: logarithm).

8. The method of producing a preform according to claim 1, wherein the molten glass body is floated by way of ejecting gas from at least a surface receiving the molten glass of the support member.

9. The method of producing a preform according to claim 1, wherein the molten glass body is floated by way of ejecting gas from at least a surface receiving the molten glass of the mold.

10. A method of producing an optical element, comprising the steps of:
    producing a preform by the method of producing according to claim 1; and
    performing precision press molding to the preform.

11. A method of producing an optical element, where a plurality of support members which receive and support molten glass is provided;
    the method comprising the steps of:
    forming a molten glass body by either receiving and cutting the molten glass, being flowed continuously from a discharge nozzle, by a support member or by allowing the molten glass to fall from the discharge nozzle and receiving the molten glass by a support member;
    displacing the support member which has received the molten glass body to near a mold disposed at a location that is not beneath the discharge nozzle, while increasing the viscosity of the molten glass body on the support member, while at the same time displacing another support member to beneath the discharge nozzle to form another molten glass body;
    respectively transferring the molten glass bodies received by the support members from the support members to the mold by way of at least one glass body transfer auxiliary member provided at positions separate from the support members, wherein the number of glass body transfer auxiliary members is smaller than the number of the support members;
    and performing precision press molding.

* * * * *

UNITED STATES PATENT AND TRADEMARK OFFICE
CERTIFICATE OF CORRECTION

PATENT NO.         : 8,056,364 B2                                      Page 1 of 1
APPLICATION NO.    : 12/289328
DATED              : November 15, 2011
INVENTOR(S)        : Sakai et al.

It is certified that error appears in the above-identified patent and that said Letters Patent is hereby corrected as shown below:

Column 7, line 56, replace "...therefore, preferred that logε is no less..." with --therefore, preferred that logη is no less...--.

Signed and Sealed this
Twenty-third Day of October, 2012

David J. Kappos
*Director of the United States Patent and Trademark Office*